United States Patent
Canning et al.

(10) Patent No.: US 7,239,613 B1
(45) Date of Patent: Jul. 3, 2007

(54) SELECTIVE PURGING OF ROUTING DATA PACKETS IN A NETWORK

(75) Inventors: Terence Canning, Belfast (GB); Philip Christian, Bishop's Stortford (GB); Derek Gilmore, Carryduff (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1052 days.

(21) Appl. No.: 10/209,043

(22) Filed: Jul. 30, 2002

(51) Int. Cl.
*H04L 12/28* (2006.01)

(52) U.S. Cl. .................. 370/254; 370/465; 370/466
(58) Field of Classification Search ............. None
See application file for complete search history.

(56) References Cited

U.S. PATENT DOCUMENTS

| | | | |
|---|---|---|---|
| 5,430,727 A * | 7/1995 | Callon | 370/401 |
| 5,854,899 A * | 12/1998 | Callon et al. | 709/238 |
| 5,987,521 A * | 11/1999 | Arrowood et al. | 709/239 |
| 6,587,475 B1 * | 7/2003 | Przygienda | 370/465 |
| 6,590,868 B2 * | 7/2003 | Shen | 370/242 |
| 7,016,313 B1 * | 3/2006 | Harper | 370/254 |
| 2004/0078619 A1 * | 4/2004 | Vasavada | 714/4 |

* cited by examiner

*Primary Examiner*—Seema S. Rao
*Assistant Examiner*—Michael J. Moore
(74) *Attorney, Agent, or Firm*—Barnes & Thornburg LLP

(57) ABSTRACT

The invention relates to a routing apparatus for routing data packets in a network comprising a sub-network, in particular a broadcast sub-network. The routing apparatus is included in a first network element of the sub-network, the first network element being arranged to support first and second protocol sets, for example OSI protocols and IP protocols. Upon designation of the first network element to represent the other network elements in the sub-network in respect of the first and second protocol sets, the routing apparatus is arranged to create a respective routing data packet for each protocol set and to cause the routing data packets to be propagated through the network. Upon resignation of the first network element as representative in respect of one of the protocol sets, the routing apparatus is arranged to cause the respective routing data packet for that protocol set only to be purged from the network.

15 Claims, 3 Drawing Sheets

SELECTIVE PURGING OF ROUTING DATA PACKETS IN A NETWORK

FIELD OF THE INVENTION

The present invention relates to the purging of routing data packets in a network, particularly a network that comprises a broadcast sub-network.

BACKGROUND TO THE INVENTION

In a communications network it is common for each network element to issue routing data packets which are then distributed to the other network elements in the network. Each routing data packet normally carries information about the network element that issued it. By gathering the information carried by received routing data packets, a network element can learn about the other network elements in the network.

The International Organization for Standardization (ISO) standard ISO 10589 specifies procedures for the transmission of configuration and routing information between network elements. The procedures are defined in terms of the interactions between network elements in the form of Intermediate System (IS) network entities through the exchange of protocol data units (PDUs), including routing data packets in the form of Link State PDUs (LSPs). ISO 10589 is hereby incorporated herein by way of reference.

ISO/IEC 10589 includes a specification of what is commonly known as Intermediate System-to-Intermediate System (IS—IS) routing protocol. Section 7.2.3 of ISO 10589 relates to IS—IS routing protocol in the context of networks which comprise a broadcast sub-network, for example an Ethernet LAN (Local Area Network). It is stipulated that if a plurality of IS network elements, serving as IS—IS routers (hereinafter "routers"), are connected on a broadcast sub-network, then one of the routers must be elected to serve as a Designated Router (DR). The DR produces a pseudonode LSP for representing all of the other routers on the broadcast sub-network. The routers on the sub-network advertise, in their respective LSPs, an adjacency with the pseudonode rather than with one or more other actual routers.

In the event that a DR relinquishes its status as a DR, it is required to initiate a network-wide purge of its pseudonode LSP. In addition, a replacement DR must be elected, its pseudonode LSPs must be propagated through the network and each router in the network must assimilate resulting new routing information. During this time, some routers in the network will be unable to communicate with other routers in the network. It is desirable therefore to minimize the amount of LSP purging that is required in order to minimize the disruption to the network.

Recent developments in telecommunications technology allow routers which support a first set of communications protocols to exist on a network, or sub-network, with other routers which do not support the first protocol set. For example, a router which supports only OSI (Open system Interconnection) protocols may be connected to a LAN which also includes a router which supports only IP (Internet Protocol) protocols. Such developments are described in ITU-T (International Telecommunications Union Telecommunications Standardization Sector) recommendation G.7712.

In such cases, it is required to elect a DR in respect of each protocol set supported by routers on the network. This can complicate the purging of pseudonode LSPs and increase the disruption caused to the network. It is desirable, therefore, to provide an efficient way of purging pseudonode LSPs in a mixed protocol network.

It will be understood that the term "protocol" as used herein is intended to embrace protocol set, or protocol stack, where the set (or stack) may comprise one or more protocols. For example, OSI and IP may each be considered to comprise a respective set of protocols, but may be referred to herein as OSI protocol or IP protocol respectively.

The present invention is described hereinafter in the context of OSI and IP protocols, although it is not limited to use with such. Respective ISO (International Organisation for Standardisation) and IETF (Internet Engineering Task Force) standards describing these protocols are publicly available.

OSI traffic comprises OSI data packets, where OSI data packets conform with OSI protocol, particularly CLNP (ConnectionLess mode Network Protocol), CLNP being an OSI network layer protocol. CLNP is the name given to the type of data packets or PDUs (Protocol Data Units) that are used to provide CLNS (ConnectionLess mode Network Service). CLNS is the service provided by the network layer of an OSI protocol stack to higher layers of the stack. Provision of CLNS service results in CLNP packets or PDUs being passed to lower layers of the stack.

IP traffic comprises IP data packets, where IP data packets conform with IP protocol, particularly IPv4 and IPv6 which are IP network layer protocols.

An IP-only network element, or node, is a node that can natively route IP packets but not OSI packets. An OSI-only node is a node that can natively route OSI packets, but not IP packets. A dual, or bi-lingual, network element, or network node, is a node that can natively route at least two protocols, particularly network layer protocols. This term is used hereinafter particularly to indicate either a node that routes both CLNS/CLNP and IPv4, or alternatively a node that routes both IPv4 and IPv6.

It will be understood that the term "router" as used hereinafter is intended to embrace a network element, network entity or network node (or part thereof) that is arranged to act as a data router. Hence, a "dual router" is a network node (or part thereof) that is capable of routing at least two protocol sets.

An adjacent network node ("adjacency") is a reachable neighbouring node. The term "adjacency" is defined in section 3.6.3 of ISO/IEC 10589 and may be used herein to denote a reachable neighbouring node. A physical neighbouring node is not necessarily a valid adjacency, since it might be in a different network area or network level. Thus, an adjacency may be maintained between nodes that are not physical neighbours.

SUMMARY OF THE INVENTION

A first aspect of the invention provides a routing apparatus for routing data packets in a network comprising a plurality of network elements each arranged to support one or more sets of one or more protocols, the network comprising a sub-network comprising a plurality of said network elements, the routing apparatus being included, in use, in a first network element of said sub-network, the first network element being arranged to support at least two protocol sets, wherein, upon designation of said first network element to represent the other network elements in the sub-network in respect of two or more of said at least two protocol sets, the routing apparatus is arranged to create a respective routing data packet for each of said two or more protocol sets and to cause said routing data packets to be propagated through the network, and wherein, upon resignation of said first network element as representative in respect of one of said protocol sets, the routing apparatus is arranged to cause the respective routing data packet for said one protocol set only to be purged from the network.

The invention enables a network element, or in particular a router, which serves as representative for more than one protocol set, to resign as representative in respect of one protocol set without causing a break in communication between network elements using another protocol. Moreover, because only the routing data packets relating to the protocol set in respect of which the network element has resigned as representative are purged, there are fewer routing data packets to purge (as compared to the scenario where all routing data packets are purged). Accordingly the length of time for which there is a break in communication between network elements using the one protocol is reduced.

In the preferred embodiment, the first network element is arranged to support Integrated Intermediate System-to-Intermediate System (IS—IS) routing protocol and said routing data packets comprise Integrated IS—IS Link State PDUs (LSPs), the routing apparatus being arranged to, when creating an LSP in respect of a protocol set, include information identifying the protocol set in the "protocols supported" field of the LSP. The routing apparatus is arranged to inspect the identifying information carried by each LSP and to initiate a purge only of the LSP carrying information identifying said one protocol set.

Preferably, the sub-network comprises a broadcast sub-network, for example in the form a LAN (Local Area Network), such as an Ethernet LAN.

Preferably, designation of said first network element to represent the other network elements in the sub-network involves election of said first network element as Designated Router in accordance with section 7.2.3 of ISO/IEC standard 10589.

In the preferred embodiment, the network element comprises a router, in particular a multi-lingual router, for example a dual router, the routing apparatus comprising the part of the network element which enables it to serve as a router.

A second aspect of the invention provides a network element comprising the routing apparatus of the first aspect of the invention.

A third aspect of the invention provides a network comprising the network element of the second aspect of the invention.

A fourth aspect of the invention provides a method of purging data routing packets in a network according to the fourth aspect of the invention, the method comprising: upon designation of said first network element to represent the other network elements in the sub-network in respect of two or more of said at least two protocol sets, creating a respective routing data packet for each of said two or more protocol sets, and causing said routing data packets to be propagated through the network, and wherein, upon resignation of said first network element as representative in respect of one of said protocol sets, causing the respective routing data packet for said one protocol set only to be purged from the network.

A fifth aspect of the invention provides a computer program product comprising computer useable instructions stored on a computer useable medium for causing a computer to perform the method according to the fourth aspect of the invention.

Other advantageous aspects and features of the invention will be apparent to those ordinarily skilled in the art upon review of the following description of a specific embodiment of the invention and with reference to the accompanying drawings.

The preferred features as described herein above or as described by the dependent claims filed herewith may be combined as appropriate, and may be combined with any of the aspects of the invention as described herein above or by the independent claims filed herewith, as would be apparent to those skilled in the art.

BRIEF DESCRIPTION OF THE DRAWINGS

A specific embodiment of the invention is now described by way of example and with reference to the following drawings in which.

DETAILED DESCRIPTION OF THE DRAWINGS

Figure 1:
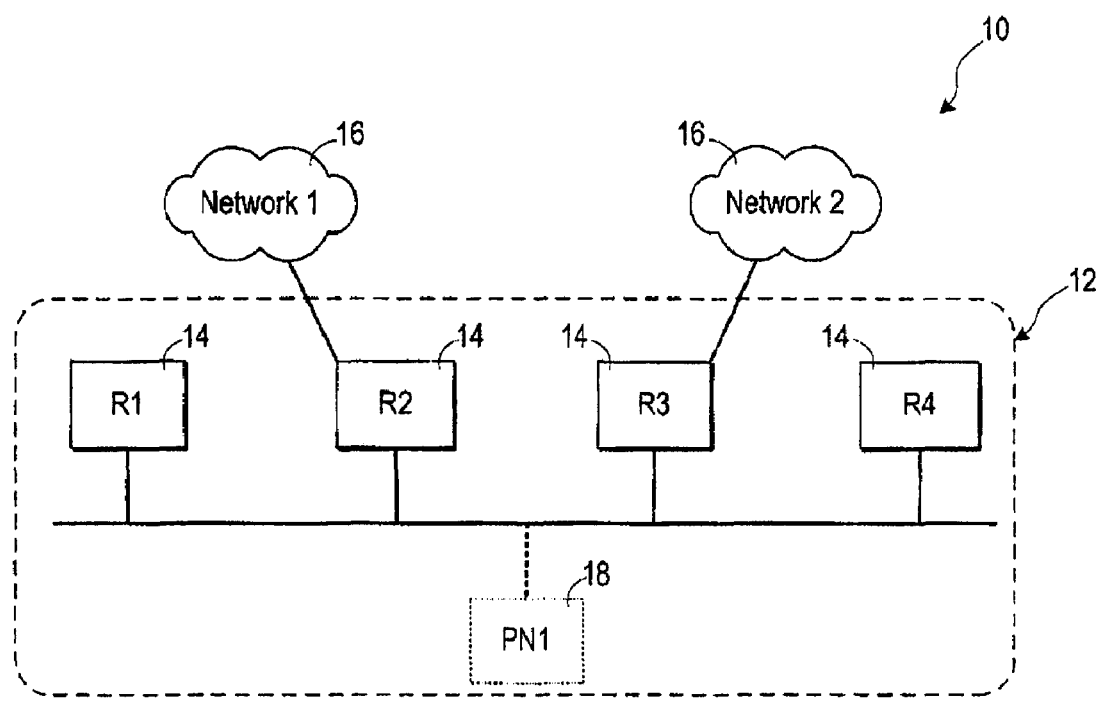
FIG. 1 is a schematic view of a communications network comprising a broadcast sub-network in which each router supports a single, common protocol set.

Referring to FIG. 1 of the drawings, there is shown, generally indicated as 10, a communications network comprising a broadcast sub-network, generally indicated as 12. The broadcast sub-network 12 comprises a plurality of network elements 14 which are labelled R1, R2, R3 and R4 in FIG. 1. The network elements 14 (which may alternatively be referred to as network nodes or network entities) comprise routing apparatus (not shown in FIG. 1) to enable them to route data packets across the network 10. Hence, the network elements 14 may be referred to as routers. In the preferred embodiment, the network 10 is assumed to support ISO/IEC standard 10589, in which context the network elements 14 may be referred to as Intermediate System (IS) network entities. In practice, the routers may be incorporated within network elements comprising network equipment such as multiplexers or cross-connects.

Within network 10, sub-network 12 is in communication with other networks 16, or network portions, represented in FIG. 1 by Network 1 and Network 2. Network 1 and Network 2 both comprise a plurality of routers (not shown). Network 1, Network 2 and sub-network 12 form part of the same routing domain which, in the present example, is assumed to comprise an IS—IS routing domain such as an IS—IS level-1 network area or an IS—IS level-2 subdomain.

In the preferred embodiment, the sub-network 12 comprises a LAN (Local Area Network), for example an Ethernet LAN. Networks 1 and 2 may comprise any compatible network, for example, a Synchronous Digital Hierarchy (SDH)/Synchronous Optical Network (SONET) network in the form of, for example, a WAN (Wide Area Network) or MAN (Metropolitan Area Network).

It is assumed that the routers 14 in sub-network 12 each support a single, common protocol set, namely OSI protocol and support IS—IS routing protocol as described in ISO 10589. In accordance with IS—IS routing protocol, each router in the network 10 creates routing data packets containing information about itself and causes these to be distributed to the other routers in the network 10. The routing data packets are normally referred to as Link State PDUs (LSPs), where PDU stands for Protocol Data Unit. Protocol Data Unit is an OSI term for data packet. Thus, LSP is sometimes used as an acronym for Link State Packet. The LSPs carry information about the node, or router, that issued them. This information includes identification of the, or each, other router in the network that is an adjacency to the issuing router, and an indication of cost, or metric. Each router gathers LSPs in respect of all other routers in the routing domain (network 10) in conventional manner. The received LSPs are stored in a database, or other suitable memory structure, commonly known as an LSP database (not shown in FIG. 1). The information contained in the gathered LSPs enables a router to determine the topography of the network 10 of which it is part. This in turn allows the router to calculate the shortest path to each other router in the network 10.

In accordance with section 7.2.3 of ISO 10589, one of the routers 14 must be elected as Designated Router (DR). The process for electing a DR is conventional and is described in ISO 10589. In the present example, it is assumed that router R3 has been elected DR. Consequently, router R3 produces a pseudonode LSP, that is, an LSP purporting to issue from a pseudonode 18 on the sub-network 12. The pseudonode 18 is represented in FIG. 1 in dashed outline and is labelled PN1. Pseudonode PN1 is adjacent each of routers R1, R2, R3, R4 and so the pseudonode LSP advertises an adjacency with each router R1, R2, R3, R4. However, the respective LSPs issued by routers R1, R2, R3, R4 advertise an adjacency only with the pseudonode PN1. Router R3 causes multiple instances of the pseudonode LSP to be propagated to other routers throughout network 10 in conventional manner.

There are a number of reasons why a router may have to relinquish its role as DR, including a change in network configuration (e.g. addition or removal of a router from the network) or intervention by the network operator. Should it be determined that router R3 should no longer serve as the DR, the in accordance with section 7.2.3 of ISO 10589, router R3 must initiate a network-wide purge of the pseudonode LSPs which it issued in its role as DR. As a result, all of the other routers in the same routing domain are required to purge the pseudonode LSP from their respective LSP database. In FIG. 1, this involves the removal of the LSP for pseudonode PN1 from the LSP databases of all routers in Network 1 and Network 2. A new DR is elected and new pseudonode LSPs are propagated through the network 10. Each router in network 10 must then re-assimilate the information in its gathered LSPs. Typically this involves running a routing algorithm, such as the "Shortest Path First" routing algorithm (as defined in Annex C of RFC 1195), in order to re-calculate the shortest, or optimal, path through the network 10 to each other router. As a result, for a period of time, the routers in Network 1 are not able to communicate with the routers in Network 2. Clearly, it is desirable to minimize the length of time for which this break in communication occurs.

Figure 2:
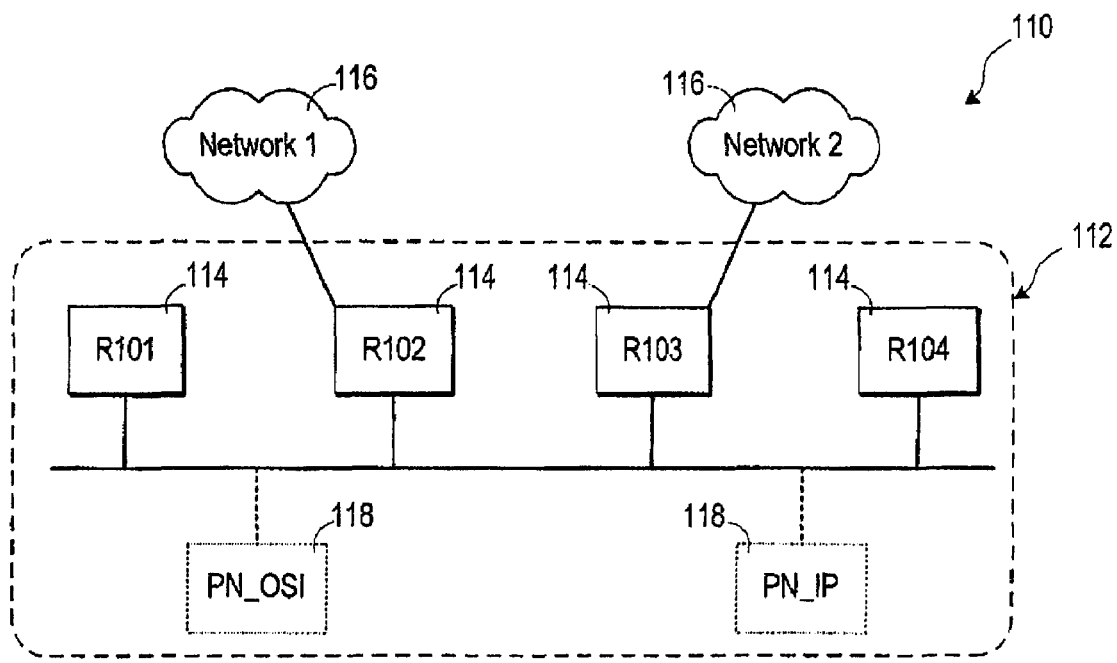
FIG. 2 is a schematic view of a communication network comprising a broadcast sub-network in which at least two routers do not support a common protocol set.

The proposed ITU-T recommendation G.7712—Architecture and Specification of Data Communication Networks—allows the use of IP protocols as well as OSI protocols on the same network. FIG. 2 illustrates, by way of example only, a network 110 comprising a broadcast sub-network 112, which are generally similar to network 10 and sub-network 12 respectively. It is assumed that sub-network 112 comprises a LAN on which routers 114 (labelled R101, R102, R103, R104) are connected. It is also assumed that the network 110 generally supports a first and a second protocol set which, in this example, are assumed to comprise the OSI and IP protocol sets respectively. Some of the routers 114 support the first protocol set but not the second, and vice versa, while other routers support both protocol sets. For illustration purposes, it is assumed that router R101 is an OSI-only router, router 104 is an IP-only router and routers 102 and 103 are dual routers supporting both OSI and IP.

A DR is elected in respect of both supported protocol sets. In the present example, it is assumed that router R103 is elected as DR in respect of both OSI and IP protocols. As a result, one option is to configure router R103 to produce a single pseudonode LSP corresponding to a single pseudonode and to cause multiple instances of the pseudonode LSP to be flooded through the network 110. This is considered to be undesirable since, if it is determined that router R103 should relinquish its role as DR in respect of one protocol set, then purging all of the pseudonode LSPs from the network 110 results in a break in communication between Network 1 and Network 2 in respect of both protocol sets.

Thus, in accordance with one aspect of the invention, when a dual-router serves as DR for two protocol sets, it is required to produce a respective pseudonode LSP for each protocol set. In the present example, router R103 creates two different pseudonode LSPs, one in respect of OSI protocol, the other in respect of IP protocol. This corresponds to the creation of respective pseudonodes 118 for each protocol. In FIG. 2, the pseudonodes 118 are represented in dashed outlined and labelled PN_OSI (the pseudonode 118 in respect of OSI protocol) and PN_IP (the pseudonode 118 in respect of IP protocol). The pseudonode LSP for PN_OSI advertises adjacencies with all routers 114 on the sub-network 112 which support OSI protocol, namely routers R101, R102, R103. The pseudonode LSP for PN_IP advertises adjacencies with all routers 114 on the sub-network 112 which support IP protocol, namely routers R102, R103, R104. Multiple instances of both pseudonode LSPs are propagated through network 110 in normal manner.

In the preferred embodiment, the routers in network 110, including routers 114, are arranged to support either IS—IS routing protocol or Integrated IS—IS routing protocol. In particular, dual routers (which support both OSI and IP protocols) and IP-only routers support Integrated IS—IS, while OSI-only routers may support IS—IS routing protocol. Thus, the pseudonode LSPs created by dual routers (e.g. router R103) are of the general type described by Integrated IS—IS routing protocol. Integrated IS—IS is a routing protocol that was devised as an extension to IS—IS routing protocol and is described in IETF standard RFC 1195. Integrated IS—IS LSPs normally carry information identifying the, or each, protocol supported by the issuing router. This information is normally carried in a "protocols supported" field (commonly known as a TLV (Type Length Value) variable length field) of the LSP. In the preferred embodiment, router R103 is arranged such that the pseudonode LSP in respect of OSI protocol includes, in a "protocols supported" field, an indication that pseudonode PN_OSI (i.e. the pseudonode that purports to issue the pseudonode LSP) supports OSI protocol, but does not include an indication that pseudonode PN_OSI supports IP protocol. Similarly, the pseudonode LSP in respect of IP protocol includes, in a "protocols supported" field, an indication that pseudonode PN_IP (i.e. the pseudonode that purports to issue the pseudonode LSP) supports IP protocol, but does not include an indication that pseudonode PN_IP supports OSI protocol.

Should it be determined that router R103 is no longer to be the DR for one of the protocol sets, then following the teaching of section 7.2.3 of ISO 10589 an network-wide purge of all of the pseudonode LSPs produced by router R103 should occur. This would mean that the pseudonode LSPs for both pseudonodes PN_OSI and PN_IP are purged from the LSP databases of the routers in Network 1 and Network 2. As a result, neither OSI data packets nor IP data packets could be transmitted between Network 1 and Network 2 until a new DR is elected in respect of said one protocol, new pseudonode LSPs are flooded through the network 110, and the routers in network 110 assimilate the information carried by the new LSPs to calculate routes across the network 110. This means that, even though router R103 relinquished its role as DR in respect of one protocol set only, other routers in Network 1 and Network 2 which would otherwise communicate with one another using the other protocol set would be unable to do so for a period of time.

Hence, in accordance with the invention, when a router which acts as DR in respect of more than one protocol set relinquishes its role as DR in respect of one of said protocol sets, the router causes only those pseudonode LSPs which relate to said one protocol set to be purged from the network. For example, if router R103 were to resign as DR in respect of OSI protocol but remain as DR in respect of IP protocol, then the arrangement would be such that router R103 would cause only the pseudonode LSPs for pseudonode PN_OSI to be purged from network 110.

Figure 3:
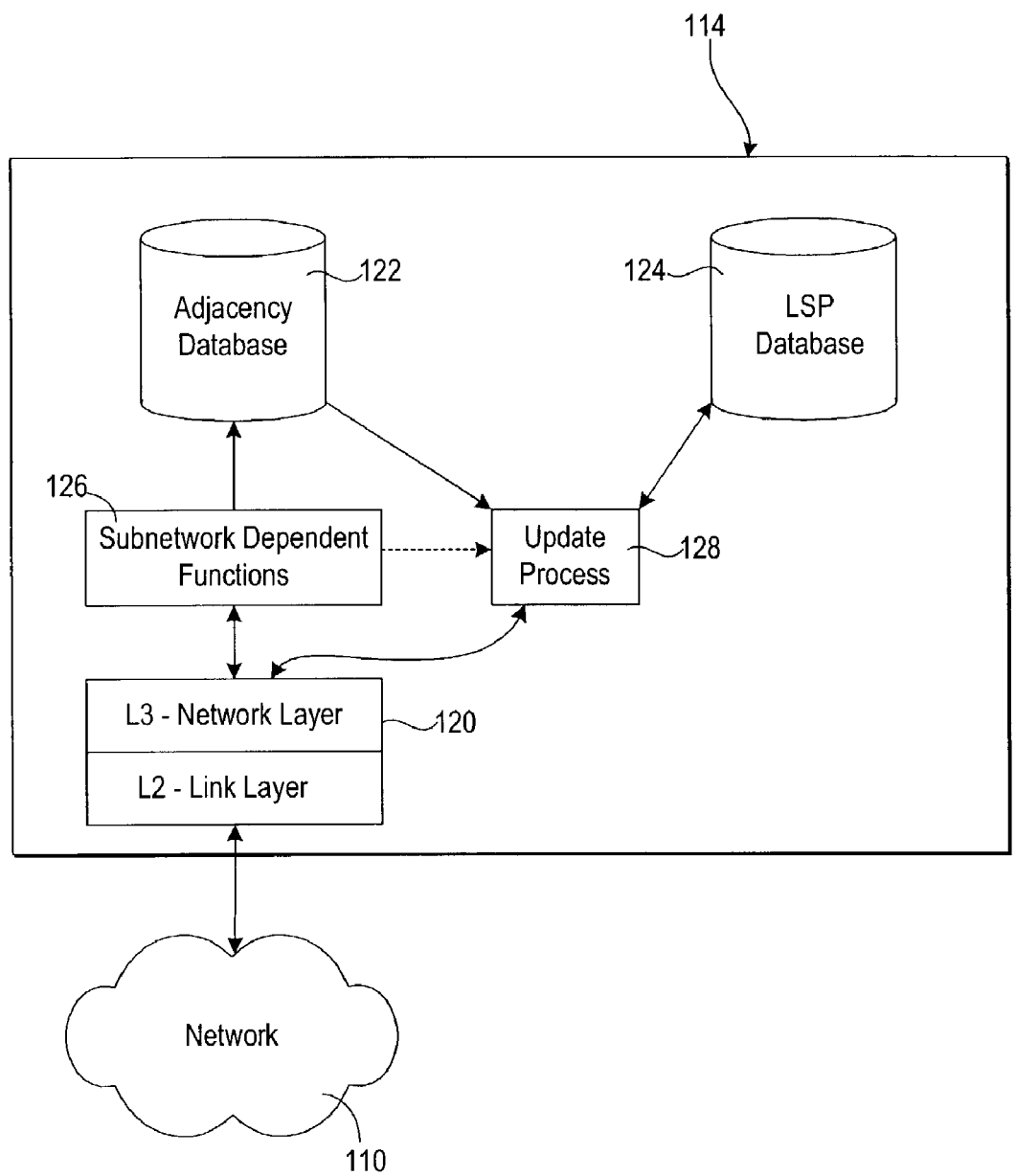
FIG. 3 is a schematic view of a router connected to a communications network.

This is now described in further detail with reference to FIGS. 3 and 4. FIG. 3 shows a simplistic schematic view of a network element, or router 114, connected to network 110. For reasons of clarity, only those components of the router 114 that are necessary for understanding the invention are shown. The router 114 communicates with the network 110 via the Network Layer (L3) and Link Layer (L2) of a conventional protocol stack 120 (only L2 and L3 of the stack 120 are shown in FIG. 3). The stack 120 may be, for example, an OSI stack or an IP stack. A dual router normally includes two protocol stacks, one for each supported protocol, although this is not shown in FIG. 3 for reasons of clarity. The router 114 gathers LSPs in respect of all other routers in the routing domain (network 110) in conventional manner. The received LSPs are stored in a database, or other suitable memory structure, commonly known as an LSP database 124. The information stored in the LSP database 124 enables the router 114 to determine the topography of the network 110 of which it is part. This in turn allows the router 114 to calculate the shortest path to each other router (not shown) in the network 110. The router 114 further includes a conventional Adjacency database 122 for storing information identifying the, or each, adjacency of the router 114. This information is conveniently compiled in normal manner by inspecting routing data packets (commonly known as IIH (Intermediate System-to-Intermediate System Hello) packets) that are received by the router 114 from its neighbours. The other routers in network 110 are generally similar to router 114 as described above.

The router 114 also comprises a Sub-Network Dependent Functions (SNDF) process module 126 as described in ISO 10589. The SNDF 126 receives IIH packets from the network 110 and uses the information carried therein to maintain the Adjacency database 122 in conventional manner. The SNDF 126 also uses the information carried in the IIH packets to determine whether or not the router 114 is required to act as a DR. This is a conventional process as described in section 8.4.5 of ISO 10589.

The router 114 further includes an Update process module 128 for implementing the Update process as specified in section 6.8.2 of ISO 10589. As is conventional, the Update process 128 is co-operable with the Adjacency database 122, the LSP database 124 and, via the (or each) protocol stack 120, the network 110 to construct, receive and propagate LSPs, including pseudonode LSPs, throughout the network 110.

The SNDF 126 is arranged to signal to the Update process module 128 in the event that the SDNF determines that the router 114 is required to adopt or relinquish the role of DR. In accordance with section 7.2.3 of ISO 10589, upon signalling by the SDNF 126 that the router 114 is no longer required to serve as a DR, the Update process module 128 initiates a network-wide purge of the pseudonode LSPs that it has created.

In accordance with the preferred embodiment of the invention, the functionality of the Update process module 128 is extended such that, upon signalling by the SDNF 126 that router 114 is no longer required to serve as DR in respect of one protocol set, the Update process inspects the respective "protocols supported" field of the pseudonode LSPs that it has created and selects to initiate a network-wide purge only of the pseudonode LSP that indicates support of said one protocol set. For example, in router R103, if SNDF 126 signals to the Update process module 128 that router R103 is required to relinquish its role as DR in respect of OSI protocol, then the Update process module 128 examines the respective "protocol supported" field of the respective pseudonode LSPs for pseudonodes PN_OSI and PN_IP. The Update process module 128 finds that the pseudonode LSP for PN_OSI indicates support for OSI protocol, while the pseudonode for PN_IP does not. Thus, the Update process module 128 initiates a network-wide purge only of the pseudonode LSP for PN_OSI (Typically, each pseudonode LSP has a respective identifier (ID) and a purge is initiated of all pseudonode LSPs having an ID corresponding to, in this example, PN_OSI).

As a result, the pseudonode LSP for PN_OSI that was produced by router R103 is removed from the LSP databases of the other routers on network 110 and pseudonode PN_OSI ceases to exist. A replacement DR must then be elected in respect of the OSI protocol. Assuming by way of example that router R101 is elected as the replacement DR in respect of OSI protocol, router R101 then produces a pseudonode LSP in respect of OSI protocol, thereby creating a new pseudonode (not shown) in respect of OSI. Router R101 then causes its OSI pseudonode LSPs to be flooded through the network 110 in normal manner. The other routers in network 110 must then re-calculate appropriate paths to other routers in the network 110 in conventional manner. During this period, OSI data packets cannot be transmitted across sub-network 112 between Network 1 and Network 2.

However, since router R103 does initiate a purge of the pseudonode LSP for pseudonode PN_IP, pseudonode PN_IP remains and, as a result, IP data packets are able to be transmitted across sub-network 112 between Network 1 and Network 2 even while a new DR is being elected in respect of OSI and the network topology in respect of OSI is being calculated.

Thus, the invention enables a router, which serves as DR for more than one protocol, to resign as DR in respect of one protocol without causing a break in communication between routers using another protocol. Moreover, because only the pseudonode LSPs relating to the protocol in respect of which the router has resigned as DR are purged, there are fewer LSPs to purge (as compared to the scenario where all pseudonode LSPs are purged). Accordingly the length of time for which there is a break in communication between routers using said one protocol is reduced.

Figure 4:
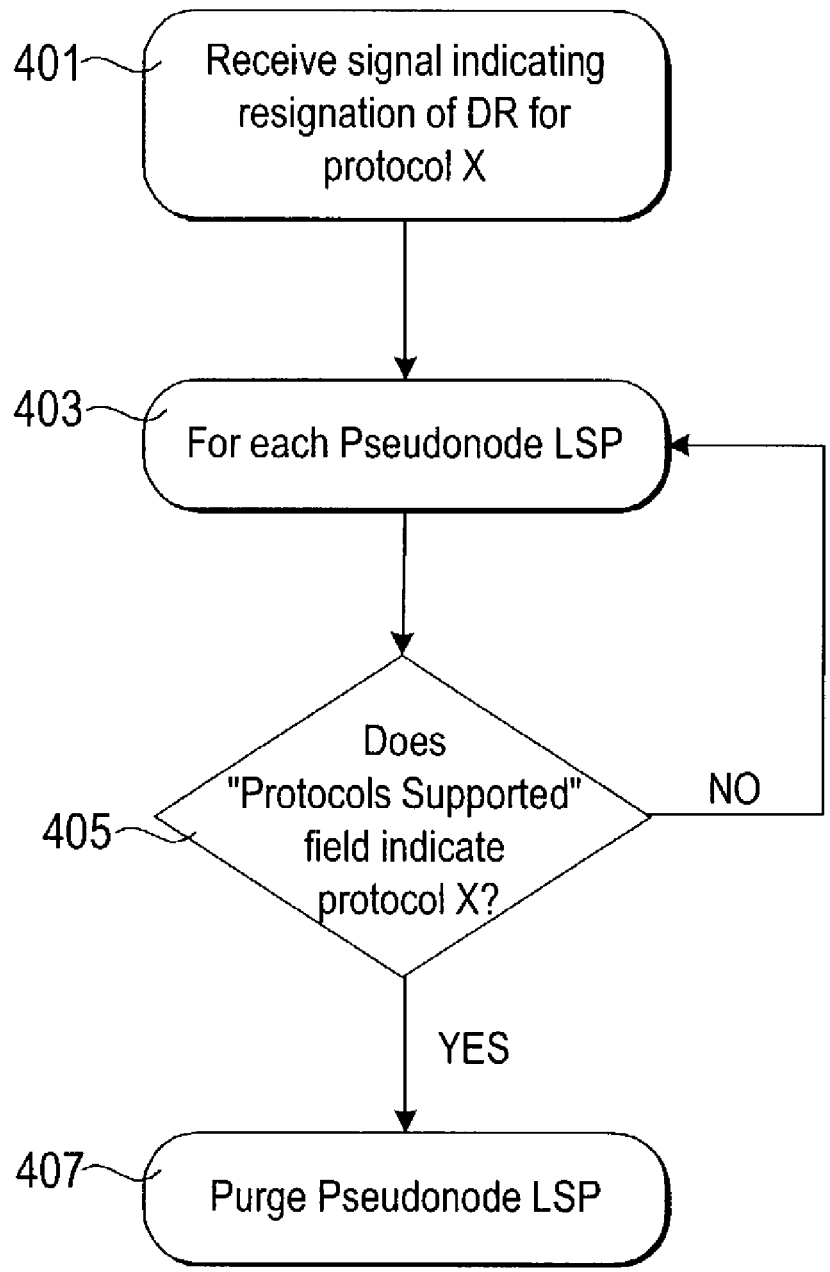
FIG. 4 is a flowchart illustrating a method of purging LSPs in accordance with one aspect of the invention.

FIG. 4 shows a flow chart illustrating the additional functionality to be performed by a router 114 when informed that it must resign as DR in respect of a given protocol X. At 401, the router 114 determines that it is required to resign as DR in respect of protocol X. At 403 and 405, a loop is created whereby the router 114 checks the "protocols supported" field of each pseudonode LSP which it has created. If the router 114 determines that the pseudonode LSP under examination does not indicate support of protocol X, then the router 114 proceed to examine the next pseudonode LSP. If the router 114 determines that the pseudonode LSP under examination does indicate support of protocol X, then, at 407, the router 114 initiates a network-wide purge of the pseudonode LSP. As described above, the algorithm illustrated in FIG. 4 may conveniently be incorporated into the functionality of the Update process as defined in section 6.8.2 of ISO 10589. Similarly, the Update process may conveniently be modified to create a respective pseudonode LSP in respect of each protocol set in respect of which the router is required to serves as DR. Thus, the invention may conveniently be implemented in computer software. Only routers 114 on the sub-network 112 which are capable of acting as DR in respect of more than one protocol need implement the algorithm.

The invention is not limited to use with OSI and IP protocols. For example, the invention may be used in a mixed (heterogeneous) network in which network elements support one or both of IPv4 (see RFC 791) and IPv6 (see RFC 2460) protocols.

Moreover, the invention may be used in networks where network elements are capable of supporting one or more of two or more protocol sets. When a multi-lingual router may is required to act as DR in respect of a plurality of protocol sets, it creates a pseudonode LSP (and hence a respective pseudonode) in respect of each protocol set. When the router is required to resign as DR in respect of one or more protocol sets at a time, the router is arranged to select to purge pseudonode LSPs in respect of said one or more protocol sets while selecting not to purge pseudonode LSPs in respect of any other protocols in respect of which the router acts as DR.

The invention is not limited to the embodiments described herein which may be modified or varied without departing from the scope of the invention.

The invention claimed is:

1. A routing apparatus for routing data packets in a network, the network comprising a plurality of network elements each arranged to support one or more sets of one or more protocols, the network comprising a sub-network comprising a plurality of said network elements, the routing apparatus being included, in use, in a first network element of said sub-network, the first network element being arranged to support at least two protocol sets, wherein, upon designation of said first network element to represent the other network elements in the sub-network in respect of two or more of said at least two protocol sets, the routing apparatus is arranged to create a respective routing data packet for each of said two or more protocol sets and to cause said routing data packets to be propagated through the network, and wherein, upon resignation of said first network element as representative in respect of one of said protocol sets, the routing apparatus is arranged to cause the respective routing data packet for said one protocol set only to be purged from the network.

2. A routing apparatus as claimed in claim 1, wherein each of said routing data packets carries information identifying only the respective protocol set in respect of which it was created, the routing apparatus being arranged to inspect the identifying information carried by each routing data packet created by the routing apparatus and to initiate a purge only of the routing data packet carrying information identifying said one protocol set.

3. A routing apparatus as claimed in claim 2, wherein said first network element is arranged to support Integrated Intermediate System-to-Intermediate System (IS—IS) routing protocol and wherein said routing data packets comprise Integrated IS—IS Link State PDUs (LSPs), the routing apparatus being arranged to, when creating an LSP in respect of a protocol set, include information identifying the protocol set in the "protocols supported" field of the LSP.

4. A routing apparatus as claimed in claim 1, wherein the sub-network comprises a broadcast sub-network.

5. A routing apparatus as claimed in claim 4, wherein the sub-network comprises a LAN (Local Area Network).

6. A routing apparatus as claimed in claim 1, wherein designation of said first network element to represent the other network elements in the sub-network involves election of said first network element as Designated Router in accordance with section 7.2.3 of ISO/IEC standard 10589.

7. A routing apparatus as claimed in claim 6, wherein the routing apparatus is arranged to create a respective pseudonode in respect of each protocol set in respect of which said first network node is elected to act as Designated Router.

8. A routing apparatus as claimed in claim 7, wherein the first network element supports Integrated Intermediate System-to-Intermediate System (IS—IS) routing protocol and the routing apparatus is arranged to, in respect of each pseudonode, create a respective routing data packet in the form of an Integrated IS—IS Link State PDU (LSP) and to include, in the "protocols supported" field of the LSP, information identifying only the protocol set in respect of which the pseudonode is created.

9. A routing apparatus as claimed in claim 8, wherein upon resignation of said first network element as Designated Router in respect of one of said protocol sets, the routing apparatus is arranged to inspect the "protocols supported" field of the respective LSP for each pseudonode created by the routing apparatus, and to cause only the LSP carrying information identifying said one protocol set to be purged from the network.

10. A routing apparatus as claimed in claim 1, comprising an Update process as defined in section 6.8.2 of ISO/IEC 10589.

11. A network element comprising a routing apparatus for routing data packets in a network, the network comprising a plurality of network elements each arranged to support one or more sets of one or more protocols, the network comprising a sub-network comprising a plurality of said network elements, the routing apparatus being included, in use, in a first network element of said sub-network, the first network element being arranged to support at least two protocol sets, wherein, upon designation of said first network element to represent the other network elements in the sub-network in respect of two or more of said at least two protocol sets, the routing apparatus is arranged to create a respective routing data packet for each of said two or more protocol sets and to cause said routing data packets to be propagated through the network, and wherein, upon resignation of said first network element as representative in respect of one of said protocol sets, the routing apparatus is arranged to cause the respective routing data packet for said one protocol set only to be purged from the network.

12. A network comprising a network element, the network element comprising a routing apparatus for routing data packets in a network, the network comprising a plurality of network elements each arranged to support one or more sets of one or more protocols, the network comprising a sub-network comprising a plurality of said network elements, the routing apparatus being included, in use, in a first network element of said sub-network, the first network element being arranged to support at least two protocol sets, wherein, upon designation of said first network element to represent the other network elements in the sub-network in respect of two or more of said at least two protocol sets, the routing apparatus is arranged to create a respective routing data packet for each of said two or more protocol sets and to cause said routing data packets to be propagated through the network, and wherein, upon resignation of said first network element as representative in respect of one of said protocol sets, the routing apparatus is arranged to cause the respective routing data packet for said one protocol set only to be purged from the network.

13. A network as claimed in claim 12, comprising a broadcast sub-network, said network element being connected on said broadcast sub-network.

14. In a network comprising a plurality of network elements each arranged to support one or more sets of one or more protocols, the network comprising a sub-network comprising a plurality of said network elements; and a routing apparatus included, in use, in a first network element of said sub-network, the first network element being arranged to support at least two protocol sets, a method of purging data routing packets, the method comprising:

upon designation of said first network element to represent the other network elements in the sub-network in respect of two or more of said at least two protocol sets, creating a respective routing data packet for each of said two or more protocol sets, and causing said routing data packets to be propagated through the network, and wherein, upon resignation of said first network element as representative in respect of one of said protocol sets, causing the respective routing data packet for said one protocol set only to be purged from the network.

15. A computer program product comprising computer useable instructions stored on a computer useable medium for causing a computer to perform the method of claim 14.

* * * * *